(12) United States Patent
Kormos

(10) Patent No.: US 6,815,680 B2
(45) Date of Patent: Nov. 9, 2004

(54) METHOD AND SYSTEM FOR DISPLAYING AN IMAGE

(75) Inventor: Alexander L. Kormos, Fairview, TX (US)

(73) Assignee: Raytheon Company, Waltham, MA (US)

(*) Notice: Subject to any disclaimer, the term of this patent is extended or adjusted under 35 U.S.C. 154(b) by 93 days.

(21) Appl. No.: 10/163,343

(22) Filed: Jun. 5, 2002

(65) Prior Publication Data

US 2003/0226966 A1 Dec. 11, 2003

(51) Int. Cl.⁷ .................................................. G01J 5/00
(52) U.S. Cl. ........................ 250/330; 250/332; 250/334
(58) Field of Search ............................... 250/330, 332, 250/334

(56) References Cited

U.S. PATENT DOCUMENTS

| | | | |
|---|---|---|---|
| 2,716,193 A | 8/1955 | Riolo | 250/215 |
| 3,803,407 A | 4/1974 | Anderson | 250/213 VT |
| 3,887,273 A | 6/1975 | Griffiths | 353/14 |
| 4,052,123 A | 10/1977 | Yamazaki et al. | 350/189 |
| 4,131,818 A | 12/1978 | Wilder | |
| 4,527,861 A | 7/1985 | Van Duyn | |
| 4,664,475 A | 5/1987 | Ferrer | 350/174 |
| 4,740,780 A | 4/1988 | Brown et al. | 340/705 |
| 4,868,652 A | 9/1989 | Nutton | 358/113 |
| 4,919,517 A | 4/1990 | Jost et al. | 350/174 |
| 4,934,771 A | 6/1990 | Rogers | 350/1.2 |
| 4,961,625 A | 10/1990 | Wood et al. | 350/174 |
| 4,970,653 A | 11/1990 | Kenue | |
| 5,001,558 A | 3/1991 | Burley et al. | 358/113 |
| 5,013,135 A | 5/1991 | Yamamura | 350/174 |
| 5,023,451 A | 6/1991 | Burley | 250/330 |
| 5,028,119 A | 7/1991 | Hegg et al. | 350/174 |
| 5,056,890 A | 10/1991 | Iino et al. | 359/630 |
| 5,237,455 A | 8/1993 | Bordo et al. | 359/632 |
| 5,289,312 A | 2/1994 | Hashimoto et al. | 359/487 |
| 5,289,315 A | 2/1994 | Makita et al. | |
| 5,299,062 A | 3/1994 | Ogata | 359/571 |
| 5,361,165 A | 11/1994 | Stringfellow et al. | |
| 5,414,439 A | 5/1995 | Groves et al. | 345/7 |
| 5,497,271 A | 3/1996 | Mulvanny et al. | 359/631 |
| 5,504,622 A | 4/1996 | Oikawa et al. | |
| 5,506,595 A | 4/1996 | Fukano et al. | |
| 5,657,163 A | 8/1997 | Wu et al. | 359/630 |
| 5,686,957 A | * 11/1997 | Baker | 348/36 |
| 5,729,016 A | 3/1998 | Klapper et al. | 250/334 |
| 5,731,903 A | 3/1998 | Cook | |
| 5,734,357 A | 3/1998 | Matsumoto | |
| 5,739,848 A | 4/1998 | Shimoura et al. | 348/119 |
| 5,748,377 A | 5/1998 | Matsumoto et al. | 359/633 |

(List continued on next page.)

FOREIGN PATENT DOCUMENTS

| | | | | |
|---|---|---|---|---|
| DE | 26 33 067 A1 | 2/1978 | | G08G/1/16 |
| EP | 0 321 149 A2 | 6/1989 | | G02B/27/00 |
| EP | 0 515 328 A1 | 11/1992 | | G02B/27/00 |

(List continued on next page.)

OTHER PUBLICATIONS

RCA Electro–Optics Handbook, *"Detection, Resolution and Recognition"*, 2 Cover Pages, Foreword, plus pp. 118–121, May 1978.

(List continued on next page.)

*Primary Examiner*—Constantine Hannaher
(74) *Attorney, Agent, or Firm*—Baker Botts L.L.P.

(57) ABSTRACT

A method and apparatus for displaying an image includes selecting a camera unit horizontal field of view (FOV) of about eighteen degrees and selecting a system magnification of between 0.4 and 1.0. The method and apparatus also includes determining an aspect ratio for the image based on the selected camera unit horizontal FOV and the selected system magnification, receiving energy from a scene for forming the image and displaying the image on a display.

17 Claims, 3 Drawing Sheets

U.S. PATENT DOCUMENTS

| | | | | |
|---|---|---|---|---|
| 5,781,243 | A | 7/1998 | Kormos | 348/556 |
| 5,805,119 | A | 9/1998 | Erskine et al. | 345/7 |
| 5,859,714 | A | 1/1999 | Nakazawa et al. | 359/13 |
| 5,864,432 | A | 1/1999 | Deter | 359/634 |
| 5,867,133 | A | 2/1999 | Toffolo et al. | 345/7 |
| 5,973,827 | A | 10/1999 | Chipper | 359/356 |
| 6,014,259 | A | 1/2000 | Wohlstadter | 359/619 |
| 6,072,444 | A | 6/2000 | Burns | 345/7 |
| 6,100,943 | A | 8/2000 | Koide et al. | 349/11 |
| 6,262,848 | B1 | 7/2001 | Anderson et al. | 359/630 |
| 6,359,737 | B1 | 3/2002 | Stringfellow | 359/631 |
| 6,392,812 | B1 | 5/2002 | Howard | 359/633 |
| 2002/0005999 | A1 | 1/2002 | Hutzel et al. | |
| 2002/0063778 | A1 | 5/2002 | Kormos | |

FOREIGN PATENT DOCUMENTS

| | | | |
|---|---|---|---|
| EP | 0 596 729 A2 | 5/1994 | |
| EP | 0 643 315 A1 | 3/1995 | G02B/27/01 |
| EP | 0 710 866 A1 | 5/1996 | G02B/27/01 |
| EP | 0 742 460 A2 | 11/1996 | G02B/27/01 |
| EP | 0 818 702 A2 | 1/1998 | |
| EP | 0 859 413 A2 | 8/1998 | |
| FR | 2 693 807 A1 | 1/1994 | G02B/27/18 |
| GB | 1131293 | 10/1968 | G02B/27/10 |
| GB | 1 584 573 | 2/1981 | B64D/43/00 |
| GB | 2179716 A | 3/1987 | G02B/27/10 |
| GB | 2 246 900 A | 2/1992 | G09F/19/18 |
| JP | 09185012 | 7/1997 | |
| JP | 2000280823 | 10/2000 | |
| WO | WO 89/03059 | 4/1989 | G02B/27/00 |
| WO | WO 98/28602 | 7/1998 | G01J/5/62 |
| WO | WO 99/33684 | 7/1999 | B60R/1/00 |
| WO | WO 01/63232 A1 | 8/2001 | |
| WO | WO 02/31439 A2 | 4/2002 | |

OTHER PUBLICATIONS

Smith, Warren J., *"Modern Optical Engineering, The Design of Optical Systems"*, Inside and Outside Cover plus pp. 104–109, McGraw–Hill Book Co., 1966.

U.S. Army Night Vision and Electronic Sensors Directorate, Visionics & Image Signal Processing Division, Fort Belvoir, VA, *"FLIR Thermal Imaging Systems Performance Model"*, Analyst's Reference Guide, Document RG5008993, Jan. 1993, 21 pages.

Holst, Gerald C., *"Testing and Evaluation of Infrared Imaging Systems"*, JCD Publishing Co., 3 Cover Pages, and pp. 308–343, 1993.

Richards, Oscar W., "Visual Needs and Possibilities for Night Automobile Driving", American Optical Corporation, Southbridge, Massachusetts, 08/67, two cover pages, pp. i, iii, v, vii, ix, xi, 1–36, 38–66, and 124–138, Aug. 1967.

U.S. patent application Ser. No. 09/558,700, filed Apr. 25, 2000, entitled "Method and Apparatus for Obtaining Infrared Images in a Night Vision System", by Alexander L. Kormos, 30 pages of text and 3 pages of drawings.

U.S. Ser. No. 09/747,035, filed Dec. 21, 2000, entitled "Method and Apparatus for Reducing Distortion in a Displayed Image", by Douglas W. Anderson, 18 pages of text and 2 pages of drawings.

U.S. Ser. No. 09/930,369, filed Aug. 15, 2001, entitled "Method and Apparatus for Displaying Information with a Head–Up Display", by Alexander L. Kormos, et al, 32 pages of text and 5 pages of drawings.

U.S. Ser. No. 09/972,543, filed Oct. 8, 2001, entitled "System and Method for Forming Images for Display in a Vehicle", by Alexander L. Kormos, 39 pages of text and 4 pages of drawings.

U.S. Ser. No. 10/038,988, filed Jan. 4, 2002, entitled "System and Method for Providing Images for an Operator of a Vehicle", by Alexander L. Kormos, 28 pages of text and 3 pages of drawings.

PCT International Search Report dated Jun. 26, 2002 for PCT/US01/31952 filed Oct. 11, 2001.

PCT International Search Report dated Aug. 31, 2000 for PCT/US00/11695 dated Apr. 26, 2000.

* cited by examiner

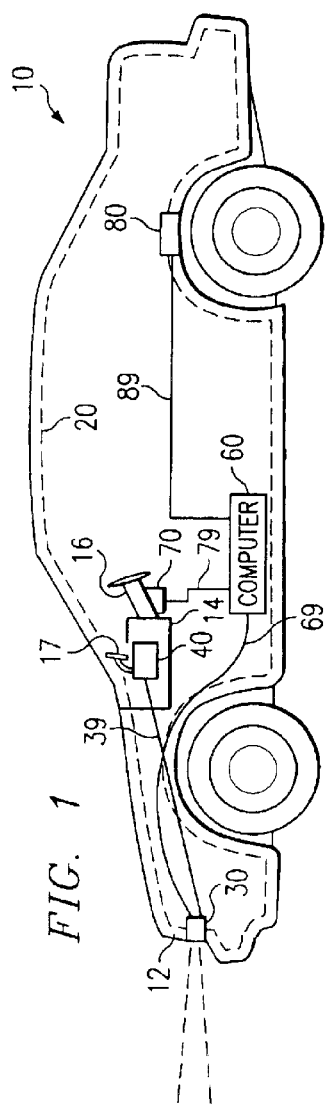
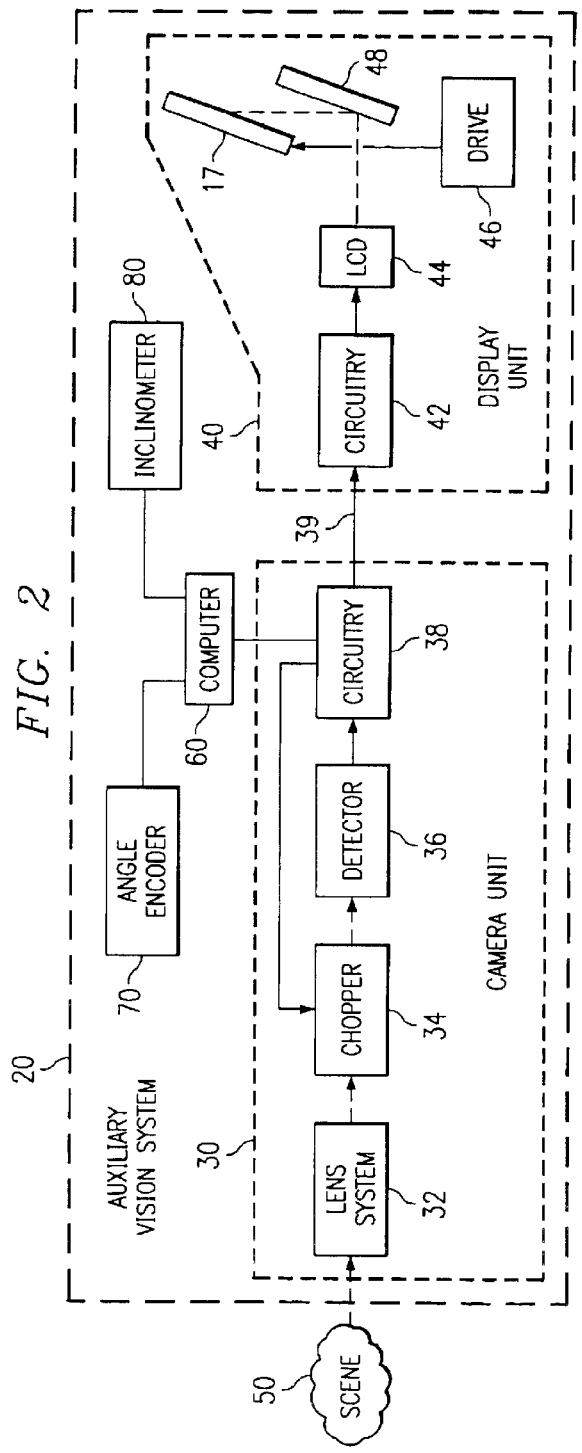
FIG. 1
FIG. 2

METHOD AND SYSTEM FOR DISPLAYING AN IMAGE

TECHNICAL FIELD OF THE INVENTION

This invention relates generally to vision systems and, more particularly, to a method and system for displaying an image.

BACKGROUND OF THE INVENTION

During daylight hours, the driver of a vehicle is able to detect and recognize objects that would be difficult, if not impossible, to detect or recognize at night. For example, on a sunny day, a deer approximately 500 meters ahead of a vehicle should be readily detectable and recognizable. At night, however, particularly when the headlights provide the only illumination, the deer will not be detectable, much less recognizable, at that distance because it will be beyond the range of the headlights. Moreover, by the time the driver detects the deer, and well before recognizing what it is, the vehicle will be much closer to the deer than during daylight. Accordingly, the risk of a resulting accident is much higher at night than during the day.

Consequently, in order reduce the risk of accidents, night vision systems have been developed to supplement the driver's vision. One example of a night vision system is included in U.S. Pat. No. 5,781,243 entitled "Display Optimization for Night Vision Enhancement Systems." Some night vision systems include an infrared camera unit mounted in the grill of the vehicle and an image source mounted in the vehicle's dashboard. The camera unit gathers information regarding the scene in front of the vehicle, and the image source projects an image derived from the information onto the windshield for display.

Using the windshield for image display, however, has several drawbacks. For example, the illumination of the image may be poor because a large amount of light is lost due to refraction. As another example, the image may be distorted because of the windshield's varying curvature. To address these drawbacks, several night vision systems are proposing to use a magnifying optical element mounted to the dashboard as a display device for the driver. Because of vision and aesthetic considerations, there is a continuing demand to reduce the size of the display device. Typical displays provide excess information which may confuse the driver. For example, the excess information may distort the depth perception of the driver, particularly when the image displayed for the driver is one that has been minified.

SUMMARY OF THE INVENTION

The present invention provides a method and system for displaying an image that substantially eliminates or reduces at least some of the disadvantages and problems associated with previous methods and systems.

In accordance with a particular embodiment of the present invention, a method for displaying an image includes selecting a camera unit horizontal field of view (FOV) of about eighteen degrees and selecting a system magnification of between 0.4 and 1.0. The method also includes determining an aspect ratio for the image based on the selected camera unit horizontal FOV and the selected system magnification, receiving energy from a scene for forming the image and displaying the image on a display.

The selected horizontal FOV may comprise eighteen degrees, and the system magnification may comprise approximately 0.55. The determined aspect ratio for the image may comprise approximately 10:3.3 or 3.1. The method may also include converting the energy received into information representative of the received energy and forming the image using the information representative of the received energy. Displaying the image on a display may comprise projecting the image onto a fold mirror and reflecting the visible image to an imaging mirror using the fold mirror.

In accordance with another embodiment, a system for displaying an image includes a camera unit having a horizontal FOV selected to be about eighteen degrees and a system magnification selected to be between 0.4 and 1.0. The system includes a display coupled to the camera unit. The display is operable to display the image. The image has an aspect ratio determined based on the selected camera unit horizontal FOV and the selected system magnification.

The system may further include a lens system operable to direct energy from a scene toward a detector and a display unit comprising the display. The display unit may be coupled to the detector and may be operable to form the image using information received from the detector. The detector may include an array of detector elements, each detector element operable to receive energy from a portion of the scene and to convert the received energy into information representative of the received energy and to send the information associated with at least some of the detector elements to the display unit. The display unit may comprise a liquid crystal display (LCD) operable to project the image onto a fold mirror. The fold mirror may be configured to reflect the visible image to an imaging mirror.

Technical advantages of particular embodiments of the present invention include an auxiliary vision system having a camera unit with a horizontal FOV of about eighteen degrees, a selected system magnification of approximately 0.4 to 1.0 and an aspect ratio determined based on the system magnification and the horizontal FOV of the camera unit. Such a system is particularly suited to present an auxiliary image that better enables a driver to properly perceive depth in the image. Furthermore, the horizontal FOV of the camera unit of about eighteen degrees presents a beneficial amount of horizontal information to the driver to effectively see potential hazards in the roadway in front of the vehicle, especially in combination with a system magnification selected between 0.4 and 1.0 and a displayed image aspect ratio based on such camera unit horizontal FOV and selected system magnification. Moreover, this horizontal FOV of the camera unit coupled with a selected magnification of between 0.4 and 1.0 can more effectively be utilized and packaged in an auxiliary vehicle system.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which:

FIG. 1 is a diagrammatic view of a vehicle that includes one embodiment of an auxiliary vision system in accordance with the present invention;

FIG. 2 is a diagrammatic view of the auxiliary vision system of FIG. 1, showing in more detail the internal structure of a camera unit and a display unit of the auxiliary vision system;

DETAILED DESCRIPTION OF THE INVENTION

Figure 3:
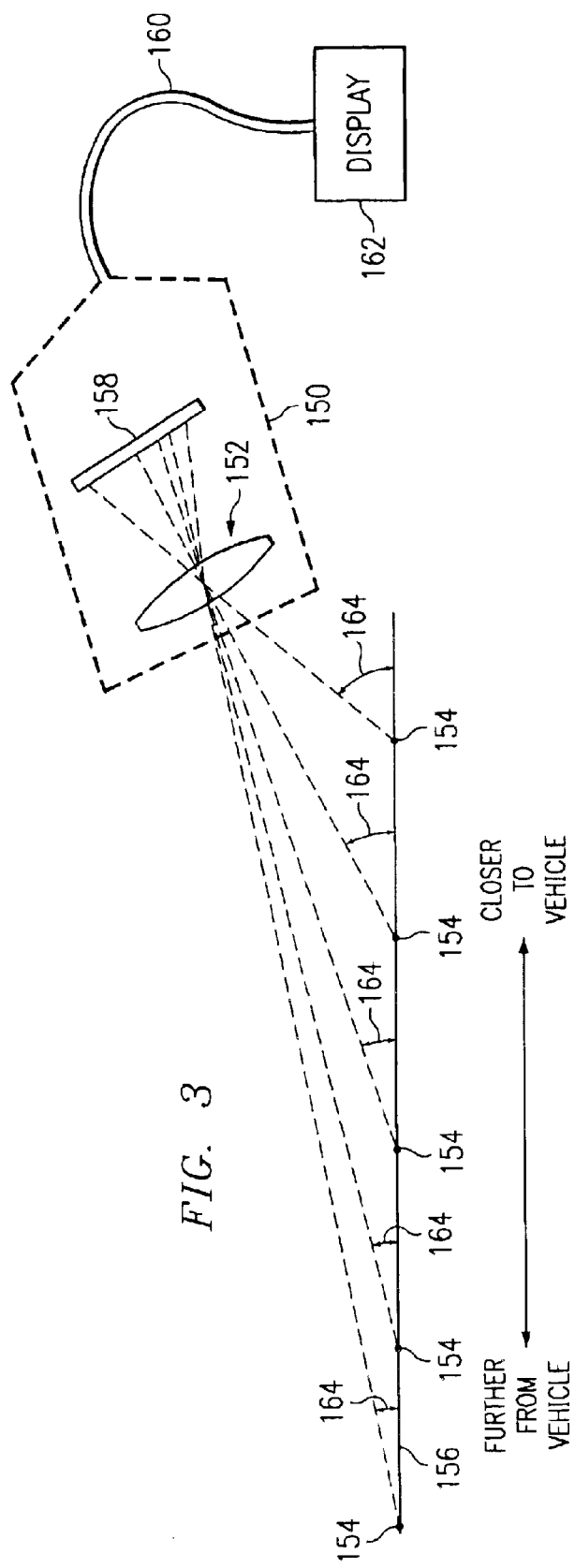
FIG. 3 is a diagrammatic view of a camera unit coupled to a display unit in accordance with an embodiment of the present invention.

FIG. 1 is a diagrammatic view of a vehicle 10 incorporating one embodiment of an auxiliary vision system 20 in accordance with an embodiment of the present invention. The auxiliary vision system 20 includes a camera unit 30, which in the illustrated embodiment is mounted at the front of vehicle 10, in the middle of a front grill 12. The camera unit 30 is electrically coupled at 39 to a display unit 40, which is also a part of the auxiliary vision system 20. The display unit 40 is of a type that is commonly known as a head-up display (HUD). The display unit 40 is mounted within a recess of a dashboard 14 of the vehicle 10, and can project a visible image for reflection by a fold mirror of display unit 40 onto a display 17 for viewing by the driver. Display 17 is recessed within dashboard 14 when auxiliary vision system 20 is not in use.

The camera unit 30 is also electrically coupled to a computer 60 at 69. The computer 60 is also part of the auxiliary vision system 20 and provides instructions to camera unit 30 based on heading information it receives from an angle encoder 70, which is coupled to a steering column 16 of vehicle 10 and electrically coupled to computer 60 at 79, and/or an inclinometer 80, which is coupled to the frame of vehicle 10 and electrically coupled to computer 60 at 89. Angle encoder 70 and inclinometer 80, which are two types of sensors, are also a part of auxiliary vision system 20. In general, any type of sensor that can provide information regarding the heading of vehicle 10, such as, for example, steering rate, inclination rate, and/or orientation, may be used in auxiliary vision system 20. Additionally, one, two, or even several sensors may be used in different embodiments. Particular embodiments may not include an angle encoder or an inclinometer. The auxiliary vision system 20 of FIG. 1 is discussed in more detail later.

When a driver is operating a vehicle at night, the driver's ability to see the road ahead is substantially more limited than would be case for the same section of road during daylight hours. This is particularly true in a rural area under conditions where there is little moonlight, there are no street lights, and there are no headlights of other vehicles. If an animal such as a deer happens to wander into the road at a location 500 meters ahead of the vehicle, the driver would readily notice and recognize the deer during daylight hours, whereas at night the deer may initially be beyond the effective reach of the illumination from the vehicle's headlights. Moreover, even when the headlights begin to illuminate the deer, the driver may not initially notice the deer, because the deer may be a brownish color that is difficult to distinguish from the surrounding darkness. Consequently, at the point in time when the driver first realizes that there is a deer in the road, the vehicle will be far closer to the deer in a nighttime situation than would be the case during daylight hours. There are many other similar high risk situations, for example, where a pedestrian is walking along the road.

One purpose of auxiliary vision system 20 of FIG. 1 is to provide the driver of the vehicle 10 with information above and beyond that which the driver can discern at night with the naked eye. In this regard, the camera unit 30 can detect infrared information at a distance well beyond the effective reach of the headlights of the vehicle 10. In the case of a life form such as an animal or a human, the heat signature of the life form, when presented in an infrared image derived from the camera unit 30, will usually have a significant contrast in comparison to the relatively hotter or cooler surrounding natural environment. As discussed above, this is not necessarily the case in a comparable nighttime image based on visible light.

Thus, in addition to the image that is directly observed by the driver through the windshield of the vehicle based on headlight illumination and any other available light, the auxiliary vision system 20 provides a separate and auxiliary image, based on infrared radiation, that is reflected onto display 17. This auxiliary image can provide a detectable representation of lifeforms or objects ahead that are not yet visible to the naked eye. Further, the auxiliary image can provide a much more striking contrast than a visible image between the lifeforms or objects and the surrounding scene. Note that the auxiliary vision system 20 may also be useful during daylight hours to supplement the view of objects seen with natural light.

Camera unit 30 has particular horizontal and vertical fields of view through which it detects an image. At least a portion of this image is ultimately displayed as the auxiliary image to the driver using display 17. This auxiliary image may include substantially all of the horizontal portion of the image detected by the camera unit 30. However, a vertical portion of the image detected by the camera unit 30 may not be displayed to the driver in the auxiliary image on display 17 so that the driver is better able to properly perceive depth in the auxiliary image displayed.

FIG. 2 is a diagrammatic view of the auxiliary vision system 20 of FIG. 1, showing in greater detail the internal structure of both the camera unit 30 and the display unit 40, in accordance with an embodiment of the present invention. More specifically, thermal radiation from a scene 50 enters the camera unit 30 and passes through a lens system 32 and a chopper 34 to a detector 36. The lens system 32 directs the incoming radiation onto an image plane of the detector 36.

In the disclosed embodiment, the chopper 34 is a rotating disk of a known type. As the chopper 34 is rotated, it modulates the incoming infrared radiation to the detector 36.

Also in the disclosed embodiment, the detector 36 is a commercially available focal plane array or staring array detector, which has a two-dimensional matrix of detector elements, where each detector element produces a respective pixel of a resulting image. In particular, detector 36 is an uncooled pyroelectric barium strontium titanate (BST) detector, although numerous other types of detectors would also be useful in auxiliary vision system 20. Other such types may include vanadium oxide, thin-film ferrolectric or alpha-silicon bolometers.

The circuitry 38 is provided to control the detector 36 and read out the images that it detects, and also to synchronize the chopper 34 to operation of the detector 36. Further, based on information from computer 60, the circuitry 38 sends the information obtained from detector 36 through the electrical coupling 39 to the circuitry 42 within the display unit 40.

The circuitry 42 controls a liquid crystal display (LCD) 44, which in the disclosed embodiment has a two-dimensional array of pixel elements. In this embodiment, the display unit 40 displays an image having a horizontal to vertical aspect ratio of 10:3.3 or 3:1. The circuitry 42 takes successive images obtained from the detector 36 through circuitry 38, and presents these on the LCD 44. The LCD 44 may include backlighting that makes the auxiliary image on LCD 44 visible at night.

This auxiliary image is projected onto a fold mirror 48 that reflects the image so as to be directed onto display 17, creating a virtual image for the driver. In the illustrated embodiment, display 17 comprises an imaging mirror. Although fold mirror 48 and display 17 are shown diagrammatically in FIG. 2 as planar components, each may have a relatively complex curvature that is known in the art. The curvature may also provide some optical power. Display 17 is movably supported, and its position at any given time is determined by a drive mechanism 46. Using the drive mechanism 46, the driver may adjust the display 17 so that it is in a viewing position comfortable for that particular driver. Once the driver has finished adjusting the display 17 to a suitable position, it remains in that position during normal operation of the auxiliary vision system 20.

It should be understood that even though in the illustrated embodiment display 17 comprises an imaging mirror, in other embodiments the auxiliary image may be displayed directly for view by the driver, without reflection off a mirror or other component. For example, in some embodiments a driver may view the image directly on an LCD, cathode ray tube (CRT) display or other type of direct view display.

FIG. 3 illustrates a camera unit 150 for use with the auxiliary vision system 20 and employing an infrared sensor and an optical system 152 that focuses equally-spaced points 154 along a roadway 156 onto a focal plane array 158. The focal plane array 158 may be an array of uncooled infrared detectors from which an image is ultimately supplied via suitable cables 160 to a display 162.

Optical system 152 is a wide-angle optical system, i.e., one that includes both near and far field points out in front of a vehicle. In such a system, equally-spaced points in object space are nonlinearly distributed on the focal plane array 158. This nonlinear distribution of optical rays may create a misjudgment of distance in the driver's mind. More specifically, the points 154 which are closer to the vehicle create a greater nonlinear distribution on the focal plane array 158. Thus, in accordance with the present invention a driver's depth perception is improved by reducing in the auxiliary image the amount of information displayed that is closer to the vehicle. The amount of such information displayed is determined based on the amount of vertical information displayed to the driver in the auxiliary image. Thus, by reducing the amount of vertical information displayed to the driver in the auxiliary image, then the amount of information closer to the vehicle that is displayed will be reduced. The driver's depth perception will therefore be improved. In particular embodiments, the pointing angle of the camera unit 30 may be elevated to reduce the amount of information closer to the vehicle that is displayed to the driver.

Figure 4:
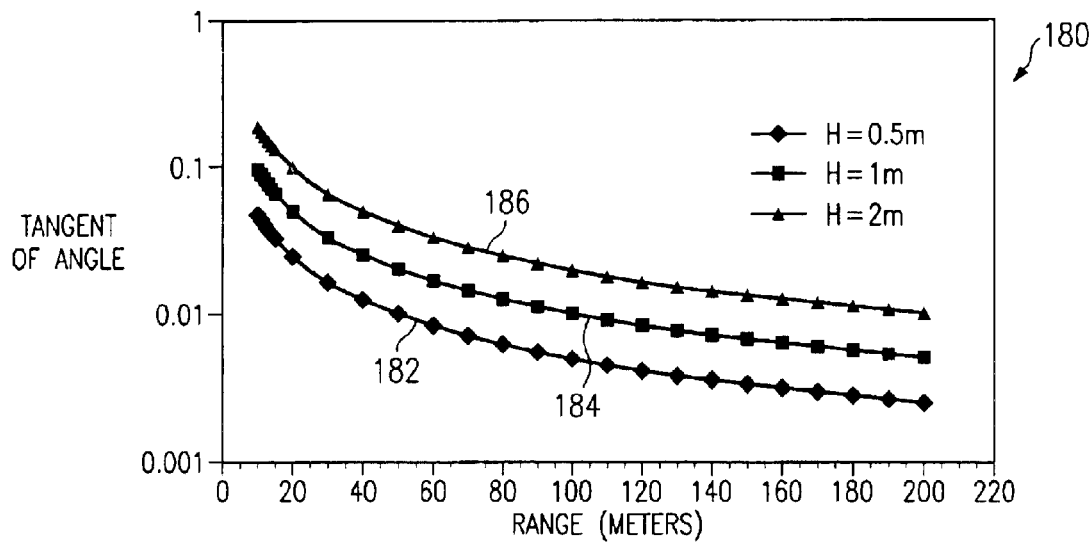
FIG. 4 is a graph illustrating the effect on depth perception of displaying information that is proximate to a camera, in accordance with an embodiment of the present invention.

For further explanation, FIG. 4 is a graph 180 illustrating three curves representing the relationship between the distance (in meters) of various points from a camera, plotted on the x-axis, and the tangent of the angle formed by the horizontal and a line from the camera to each point (for example, angles 164 of FIG. 3), plotted on the y-axis. Each curve represents a relationship with the camera at a particular height. Curve 182 represents a relationship when the camera is at a height of 0.5 meters, curve 184 represents a relationship when the camera is at a height of 1.0 meter and curve 186 represents a relationship when the camera is at a height of 2.0 meters.

From graph 180, one can observe that as the distance from the camera increases, each curve becomes more linear. However, when the distance from the camera is closer to zero (especially, for example, when the distance is less than approximately sixty meters), each curve is non-linear. This is indicative of the distortion in depth perception that can occur when viewing on a display an object that is relatively closer to the vehicle.

The importance of the overall system magnification between an object in the real world and an object as viewed on the display should also be noted. The system magnification may be computed as follows:

$$\text{system magnification} = \theta_D/\theta_O$$

where
$\theta_O$ = angular subtense of feature in object space
$\theta_D$ = angular subtense of feature as viewed on display at the driver's eye position.

The angular subtense $\theta_D$ may be computed as follows:

$$\theta_D = 2\tan^{-1}((A/2)/B)$$

where
A = linear dimension of displayed feature
B = distance of driver's eye to display.

It should be noted that the angular subtense $\theta_D$ for a head-up display is defined by the field of view of the device, which is defined by the magnifying power of the projection mirror.

Given the system magnification relationship, it is noted that a system magnification which is less than 1.0 creates a problem in judging depth in the displayed auxiliary image. If the system magnification were always held to the value 1, the field of view (FOV) of the camera unit 30 would have little effect on the displayed information. This, however, requires a very large display 17 for wide field angles in the camera unit 30. Since a large display is impractical to package in many vehicles, the relationship described above with respect to system magnification becomes very useful in determining the amount of information to provide in the auxiliary image when a wide field angle is desired for the horizontal FOV of the camera unit 30.

Given the explanation discussed above, it is noted that a driver's depth perception of an auxiliary image is affected by the amount of information closer to the vehicle that is displayed and the magnification of the image. As stated above, one can reduce the amount of information closer to the vehicle that is displayed by reducing the amount of vertical information. It is desired to display in the auxiliary image substantially all of information in the horizontal FOV of the camera unit 30. Thus, to change the amount of vertical information displayed, the aspect ratio (the ratio of horizontal to vertical) of the image displayed on the display 17 may be modified. The magnification of an auxiliary vision system 20 may be changed by changing the horizontal FOV of the camera unit 30, the horizontal dimension of the image on display 17 or the distance between the driver's eye and the display 17.

Therefore, optimizing an auxiliary image displayed by display 17 is achievable by selecting a horizontal FOV for the camera unit 30, selecting a magnification for auxiliary vision system 20 and determining an aspect ratio for the displayed image based on such selections in order to reduce distortion in a driver's depth perception. In particular embodiments, the horizontal FOV of the camera unit 30 is about eighteen degrees (for example, between fifteen and twenty-one degrees or between fifteen and twenty-five degrees). In such embodiments, the system magnification may range from approximately 0.4 to 1.0. An aspect ratio for the image displayed on display 17 is selected in order to better enable the driver to properly perceive depth in the auxiliary image. In one embodiment, the horizontal FOV of camera unit 30 is eighteen degrees, the system magnification is approximately 0.55 and the aspect ratio of the displayed image is approximately 10:3.3.

It has been determined that an auxiliary vision system 20 having a camera unit 30 with a horizontal FOV of about eighteen degrees, a selected system magnification of approximately 0.4 to 1.0 and an aspect ratio determined based on the system magnification and the horizontal FOV of the camera unit 30 is particularly suited to present an improved auxiliary image that better enables a driver to properly perceive depth in the image. For example, a driver of a vehicle that includes an auxiliary vision system 20 as described herein is better able to judge the size of objects in front of the vehicle that are shown on display 17. Furthermore, the horizontal FOV of the camera unit 30 of about eighteen degrees presents a beneficial amount of horizontal information to the driver to effectively see potential hazards in the roadway in front of the vehicle, especially in combination with a system magnification selected between 0.4 and 1.0 and a displayed image aspect ratio based on such camera unit horizontal FOV and selected system magnification. Moreover, this horizontal FOV of camera unit 30 coupled with a selected magnification of between 0.4 and 1.0 can more effectively be utilized and packaged in an auxiliary vehicle system 20.

A displayed image aspect ratio determined based on a horizontal FOV of about eighteen degrees and a system magnification of between 0.4 and 1.0 also optimally minimizes the number of eye fixations required to view the displayed image. The number of eye fixations required to assimilate information from a display is directly proportional to angular area. Thus, minimizing the number of eye fixations is desirable for safety and efficiency in a display for aircraft, automobiles, trucks, recreational vehicles, or any other form of moving vehicle. A displayed image having an aspect ratio determined as discussed above minimizes the number of eye fixations by minimizing the amount of displayed information for the viewer to observe.

Figure 5:
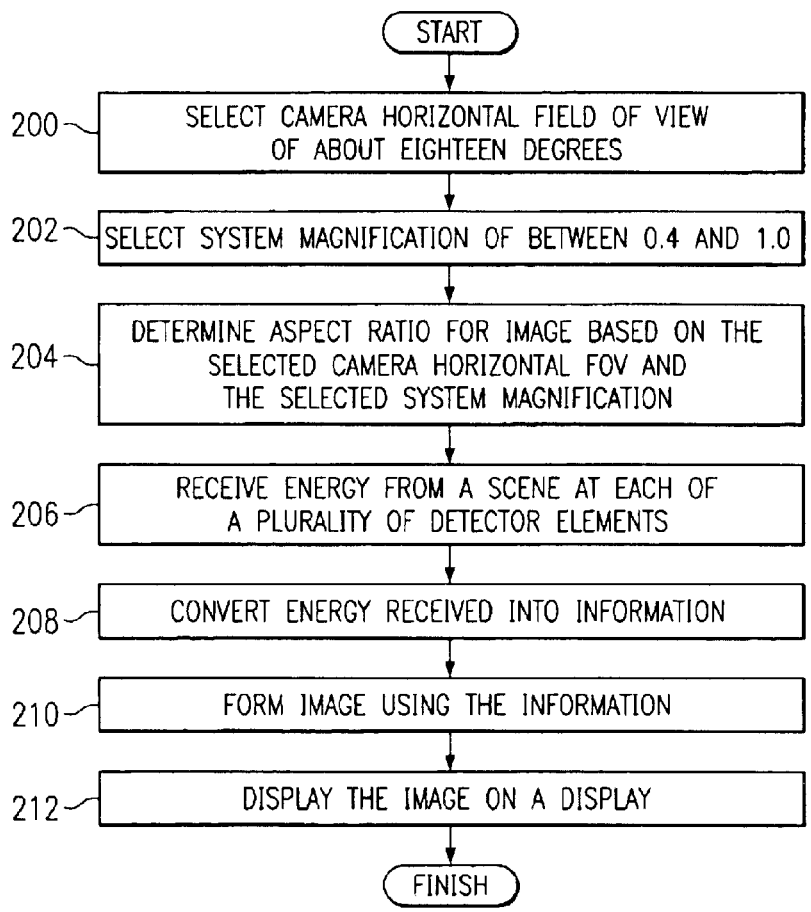
FIG. 5 is a flowchart illustrating a method for displaying an image, in accordance with an embodiment of the present invention.

FIG. 5 is a flowchart illustrating a method for displaying an image, in accordance with an embodiment of the present invention. The method begins at step 200 where a camera unit 30 horizontal FOV of about eighteen degrees is selected. In particular embodiments, the selected camera unit 30 horizontal FOV may be approximately between fifteen and twenty-five degrees. At step 202, a system magnification of between 0.4 and 1.0 is selected. At step 204, an aspect ratio for the image is determined based on the selected camera unit horizontal FOV and the selected system magnification. The aspect ratio is determined based on the selected camera unit 30 horizontal FOV and system magnification such that an observer properly and effectively perceives depth in a display image.

The method continues at step 206 where energy from a scene 50 is received at each of a plurality of detector elements. At step 208, the energy received at each detector element is converted into information representative of the energy received at step 206. At step 210, an image is formed using the information representative of the received energy. At step 212, the image is displayed by projection by an LCD 44 onto a fold mirror 48 for reflection onto an imaging mirror 17 for view by the driver of a vehicle. Through the image, the driver may detect lifeforms or objects ahead that are not yet visible to the naked eye.

Although the present invention has been described in detail, various changes and modifications may be suggested to one skilled in the art. It is intended that the present invention encompass such changes and modifications as falling within the scope of the appended claims.

What is claimed is:

1. A method for displaying an image on a display, comprising:

selecting a camera unit horizontal field of view (FOV) of about eighteen degrees;

selecting a system magnification of approximately 0.5 to 0.6;

determining an aspect ratio for the image based on the selected camera unit horizontal FOV and the selected system magnification;

receiving energy from a scene for forming the image; and displaying the image on a head-up display of an automobile.

2. The method of claim 1, wherein selecting a system magnification of approximately 0.5 to 0.6 comprises selecting a system magnification of approximately 0.55.

3. The method of claim 1, wherein:

selecting a camera unit horizontal field of view (FOV) of about eighteen degrees comprises selecting a camera unit horizontal FOV of eighteen degrees;

selecting a system magnification of approximately 0.5 to 0.6 comprises selecting a system magnification of approximately 0.55; and determining an aspect ratio for the image based on the selected camera unit horizontal FOV and the selected system magnification comprises determining an aspect ratio for the image of approximately 10:3.3.

4. The method of claim 1, wherein displaying the image on a display comprises reflecting the image onto an imaging minor.

5. The method of claim 1, wherein displaying the image on a display comprises displaying the image on a liquid crystal display (LCD).

6. A method for displaying an image on a display, comprising:

selecting a camera unit horizontal field of view (FOV) of about eighteen degrees;

selecting a system magnification from approximately 0.5 to 0.6;

determining an aspect ratio for the image based on the selected camera unit horizontal FOV and the selected system magnification;

receiving energy from a scene for forming the image at each of a plurality of detector elements;

converting the energy received at each detector element into information representative of the received energy;

forming the image using the information representative of the received energy; and displaying the image on a head-up display of an automobile.

7. The method of claim 6, displaying the image on a display comprises projecting the image onto a fold mirror and reflecting the visible image to an imaging mirror using the fold mirror.

8. A system for displaying an image, comprising:

a camera unit having a horizontal field of view (FOV) selected to be about eighteen degrees;

a system magnification selected to be from approximately 0.5 to 0.6; and a head-up display of an automobile coupled to the camera unit, the display operable to display the image, the image having an aspect ratio determined based on the selected camera unit horizontal FOV and the selected system magnification.

9. The system of claim 8, wherein a system magnification selected to be between 0.4 and 1.0 comprises a system magnification selected to be approximately 0.5 to 0.6.

10. The system of claim 8, wherein:

a camera unit having a horizontal field of view (FOV) selected to be about eighteen degrees comprises a camera unit having a horizontal FOV selected to be eighteen degrees;

a system magnification selected to be between 0.4 and 1.0 comprises a system magnification selected to be approximately 0.55; and the image having an aspect ratio determined based on the selected camera unit horizontal FOV and the selected system magnification comprises the image having an aspect ratio of approximately 10:3.3.

11. The system of claim 8, wherein the display comprises the imaging mirror and further comprising a fold mirror operable to display the image onto the imaging mirror.

12. The system of claims 8, wherein the display comprises a liquid crystal display (LCD).

13. A system for displaying an image, comprising:

a camera unit having a horizontal field of view (FOV) selected to be about eighteen degrees;

a system magnification selected to be from approximately 0.5 to 0.6;

a head-up display of an automobile coupled to the camera unit, the display operable to display the image, the image having an aspect ratio determined based on the selected camera unit horizontal FOV and the selected system magnification;

a lens system operable to direct energy from a scene toward a detector;

a display unit comprising the display, the display unit coupled to the detector, the display unit operable to form the image using information received from the detector; and wherein the detector includes an array of detector elements, each detector element operable to receive energy from a portion of the scene and to convert the received energy into information representative of the received energy and to send the information associated with at least some of the detector elements to the display unit.

14. The system of claim 13, wherein the display unit comprises a liquid crystal display (LCD) operable to project the image onto a fold mirror, the fold mirror configured to reflect the visible image to an imaging mirror.

15. The system of claim 13, wherein the detector comprises a vanadium oxide bolometer.

16. The system of claim 13, wherein the detector comprises a thin-film ferrolectric bolometer.

17. The system of claim 13, wherein the detector comprises an alpha-silicon bolometer.

* * * * *